United States Patent
Hwang et al.

(10) Patent No.: US 10,720,653 B2
(45) Date of Patent: Jul. 21, 2020

(54) BIPOLAR PLATE INTAKE STRUCTURE OF FUEL CELL HAVING DRAINAGE CHANNELS

(71) Applicant: Jenn-Jiang Hwang, Tainan (TW)

(72) Inventors: Jenn-Jiang Hwang, Tainan (TW); Wei-Hong Weng, Tainan (TW); Sung-En Wang, Tainan (TW); Chih-Hong Lin, Tainan (TW)

(73) Assignee: Jenn-Jiang Hwang, Tainan (TW)

( * ) Notice: Subject to any disclaimer, the term of this patent is extended or adjusted under 35 U.S.C. 154(b) by 190 days.

(21) Appl. No.: 15/822,375

(22) Filed: Nov. 27, 2017

(65) Prior Publication Data

US 2018/0151893 A1    May 31, 2018

(30) Foreign Application Priority Data

Nov. 30, 2016   (TW) .............................. 105139452 A

(51) Int. Cl.
*H01M 8/0258* (2016.01)

(52) U.S. Cl.
CPC ................................ *H01M 8/0258* (2013.01)

(58) Field of Classification Search
None
See application file for complete search history.

(56) References Cited

U.S. PATENT DOCUMENTS

| | | | | |
|---|---|---|---|---|
| 6,231,053 B1* | 5/2001 | Wakamatsu | ........ | H01M 8/0271 277/628 |
| 2004/0209150 A1* | 10/2004 | Rock | ................. | H01M 8/0258 429/434 |
| 2006/0035133 A1* | 2/2006 | Rock | ................. | H01M 8/0228 429/508 |
| 2008/0124610 A1* | 5/2008 | Kaiser | ............... | H01M 8/0206 429/457 |
| 2008/0254339 A1* | 10/2008 | Owejan | ............ | H01M 8/0228 429/434 |
| 2014/0295322 A1* | 10/2014 | Shibuya | ............ | H01M 8/0228 429/509 |

FOREIGN PATENT DOCUMENTS

EP   2034544 A1 *  3/2009  .......... H01M 8/0267

* cited by examiner

*Primary Examiner* — Tracy M Dove
(74) *Attorney, Agent, or Firm* — Rosenberg, Klein & Lee

(57) ABSTRACT

A bipolar plate intake structure of a fuel cell having drainage channels is disclosed herein. It mainly comprises an anode electrode plate having a gas flow path plane, a first inlet portion, a first outlet portion, and a first sealing member, wherein the first sealing member is provided with a first sealing structure for sealing the anode electrode plate and isolating the gas flow path plane, the first inlet portion, and the first outlet portion from each other; and a cathode electrode plate having a gas flow path plane, a second inlet portion, a second outlet portion, and a second sealing member, wherein the second sealing member is provided with a second sealing structure for sealing the cathode electrode plate and isolating the gas flow path plane, the second inlet portion and the second outlet portion from each other.

9 Claims, 5 Drawing Sheets

BIPOLAR PLATE INTAKE STRUCTURE OF FUEL CELL HAVING DRAINAGE CHANNELS

BACKGROUND OF THE INVENTION

1. Field of the Invention

The present invention relates to a bipolar plate intake structure of a fuel cell having drainage channels, especially for a metal bipolar plate of a fuel cell, which has sealing members for completely sealing the gap of the fuel cell to allow the fuel gas, oxidant, coolant and the like to be evenly distributed in a specific gas flow path plane, avoid leakages of fuel gas and an oxidant, and increase corrosion resistance, mechanical strength, and the life of the fuel cell.

2. Description of Related Art

As the traditional petrochemical energy has been gradually depleted and the use of petrochemical energy makes a significant impact on the ecological environment, governments around the world have turned to the development of low-pollution and energy-efficient energy sources. Among the new developed energy sources including solar cells, biochemical energy, fuel cells, and the like, the fuel cells have attracted attention due to having a high power generation efficiency of about 60% and low pollution.

A fuel cell is a power generation device that directly converts the chemical energy from a fuel into electricity through an electrochemical reaction of hydrogen-containing fuel (e.g. methanol, ethanol, hydrogen, and the like) with oxygen or other oxidants. In addition to electricity, fuel cells also produce a by-product of water. Compared with the traditional power generation methods, the fuel cell has the advantages of low pollution, low noise, and high energy conversion efficiency. Moreover, electricity of the fuel cell is directly converted from oxidation reactions of the fuel, so its discharge current increase as the fuel supply increases and it can continuously generate electricity as long as the fuel and oxygen are fully supplied. Accordingly, the fuel cell does not have the problems of power outage, charging and pollution.

Generally, a fuel cell is constituted by a membrane electrode assembly (MEA) and electrode plates. The MEA is referred as a core of the fuel cell for electrochemical reactions, and the electrode plate is one of the key factors influencing the commercialization of fuel cell. There are many problems of electrode plate material, flow field structure or processing cost of the fuel cell to be solved.

Specially, the traditional electrode plate is mainly made from graphite, composite carbon and metal substrates. For the electrode plate formed of the graphite and the composite carbon material, it has the advantages of conductivity and corrosion resistance, but its manufacturing process is complicated and time consuming. Moreover, the electrode plate formed of the graphite and the composite carbon material has a thickness of not less than 3 mm, which is not conducive to the miniaturization of the fuel cells. For the electrode plate formed of the metal substrates, it has the advantages of a less thickness and a light weight to reduce the volume and the weight of the fuel cells. However, this kind of fuel cell made from the metal electrode plates has lower electricity production efficiency due to a low transport capacity of flow ducts on the metal electrode plates. As the fuel and oxidant used in the fuel cell is gas (e.g. hydrogen and oxygen) and the coolant used in the fuel cell is liquid, the gaps between the membrane electrode assembly and two bipolar plates (e.g. anode electrode plate and the cathode electrode plate) must be sealed to prevent leakages of the fuel gas, oxidant, and coolant liquid whiling the fuel gas, oxidant, and coolant liquid are flowing in the flow ducts of the bipolar plates.

In addition, the design for a gas flow path of a traditional anode electrode plate or a traditional cathode electrode plate is directly communicated with a gas entry and a gas outlet. When assembled with a conventional seal member, an entry end and an outlet end must be further affixed with a metal sheet as a reinforcement to withstand the pressure force in assembling the anode electrode plate and the cathode electrode plate and avoid damage. In such a case, the assembly process of the bipolar plate of the fuel cell becomes complicated, and the probability of leakages due to a poor assembly may be increased.

SUMMARY OF THE INVENTION

In view of the above-mentioned problems, the object of the present invention is to provide a bipolar plate intake structure of a fuel cell having drainage channels which has a packing piece structure for sealing a bipolar plate, e.g. an anode electrode plate and a cathode electrode plate of a fuel cell, and for effectively filling the gap among a membrane electrode assembly, the anode electrode plate and the cathode electrode plate to avoid leakages of fuel gas and an oxidant and to ensure that the location of the membrane electrode assembly is stable.

Disclosed herein is a bipolar plate intake structure of a fuel cell having drainage channels. It at least comprises an anode electrode plate and a cathode electrode plate.

The anode electrode plate has a gas flow path plane shaped by stamping processing, a first inlet portion disposed on one side of the gas flow path plane, and a first outlet portion disposed on the other side of the gas flow path plane and being mirror symmetric and up-and-down symmetric to the first inlet portion, wherein the gas flow path plane has a plurality of flow ducts for a flow of hydrogen. The first inlet portion has a hydrogen entry end, a coolant inflow hole, and an oxygen entry end, and the first outlet portion has a hydrogen outlet end, coolant outflow hole, and an oxygen outlet end. The hydrogen flows into the hydrogen entry end of the first inlet portion, passes through a hydrogen inlet, the plurality of flow ducts and the hydrogen outlet, and finally flows out of the hydrogen outlet end of the first outlet portion.

The cathode electrode plate has a gas flow path plane shaped by stamping processing, a second inlet portion disposed on one side of the gas flow path plane, and a second outlet portion disposed on the other side of the gas flow path plane and being mirror symmetric and up-and-down symmetric to the second inlet portion, wherein the gas flow path plane has a plurality of flow ducts for a flow of oxygen. The second inlet portion has a hydrogen entry end, a coolant inflow hole, and an oxygen entry end, and the second outlet portion has a hydrogen outlet end, a coolant outflow hole, and an oxygen outlet end. The oxygen flows into the oxygen entry end of the second inlet portion, passes through an oxygen inlet, the plurality of flow ducts and an oxygen outlet, and finally flows out of the oxygen outlet end of the second outlet portion.

The anode electrode plate and the cathode electrode plate further have a first sealing member and a second sealing member respectively. The first sealing member has a first sealing structure for correspondingly sealing the anode electrode plate. The first sealing structure has three compartments for isolating the gas flow path plane, the first inlet portion, and the first outlet portion from each other. The first inlet portion further has a first drainage channel on a position of the first sealing structure stacking thereon for guiding a flow of the hydrogen. The second sealing member has a second sealing structure for correspondingly sealing the cathode electrode plate. The second sealing structure has three compartments for isolating the gas flow path plane, the second inlet portion, and the second outlet portion from each other. The second inlet portion further has a second drainage channel on a position of the second sealing structure stacking thereon for guiding a flow of the oxygen.

According to an embodiment of the present invention, the first sealing member is made of a Teflon® material or an injection molding resin material.

According to an embodiment of the present invention, the first sealing member has a thickness ranging from 0.4 mm to 0.8 mm.

According to an embodiment of the present invention, the second sealing member is made of a Teflon® material or an injection molding resin material.

According to an embodiment of the present invention, the second sealing member has a thickness ranging from 0.4 mm to 0.8 mm.

According to an embodiment of the present invention, the anode electrode plate is joined to the cathode electrode plate by a welding process for sealing a flow field.

According to an embodiment of the present invention, the welding process is a laser beam welding.

In addition, disclosed herein is a fuel cell having a plurality of fuel cell units connected in series, each of the plurality of fuel cell units comprises a membrane electrode assembly (MEA) and two bipolar plate intake structures as described above and reversely disposed on each other, wherein the first sealing member, the membrane electrode assembly and the second sealing member are sequentially arranged between the two bipolar plate intake structures, and wherein each of the two bipolar plate intake structures has an anode electrode plate joined to a cathode electrode plate by a welding process.

According to an embodiment of the present invention, the first sealing member is disposed on the anode electrode plate, and the second sealing member is disposed on the cathode electrode plate.

Accordingly, the bipolar plate intake structure of a fuel cell having drainage channels of the present invention has a first sealing member and a second member made of a Teflon® material or an injection molding resin material and can be disposed on an anode electrode plate and a cathode electrode plate for effectively filling the gap among a membrane electrode assembly, the anode electrode plate and the cathode electrode plate to avoid leakages of fuel gas and an oxidant and to ensure that the location of the membrane electrode assembly is stable.

Furthermore, a coolant liquid flow path of the bipolar plate intake structure of a fuel cell having drainage channels of the present invention is directly welded by a laser beam welding for sealing a flow field. An outer ring contact surface of the anode metal bipolar plate and the cathode metal bipolar plate is a welding portion. After the inlets and outlets of gas and an outer frame of the two metal bipolar plates are welded, the purpose of seal of the present invention can be achieved. In such a case, the present invention prevents leakages of coolant liquid and has efficacy of strengthening the overall structure of the fuel cell.

DETAILED DESCRIPTION OF THE PREFERRED EMBODIMENT

Hereinafter, an exemplary embodiment of the present invention will be described in detail with reference to the accompanying drawings.

Figure 1:
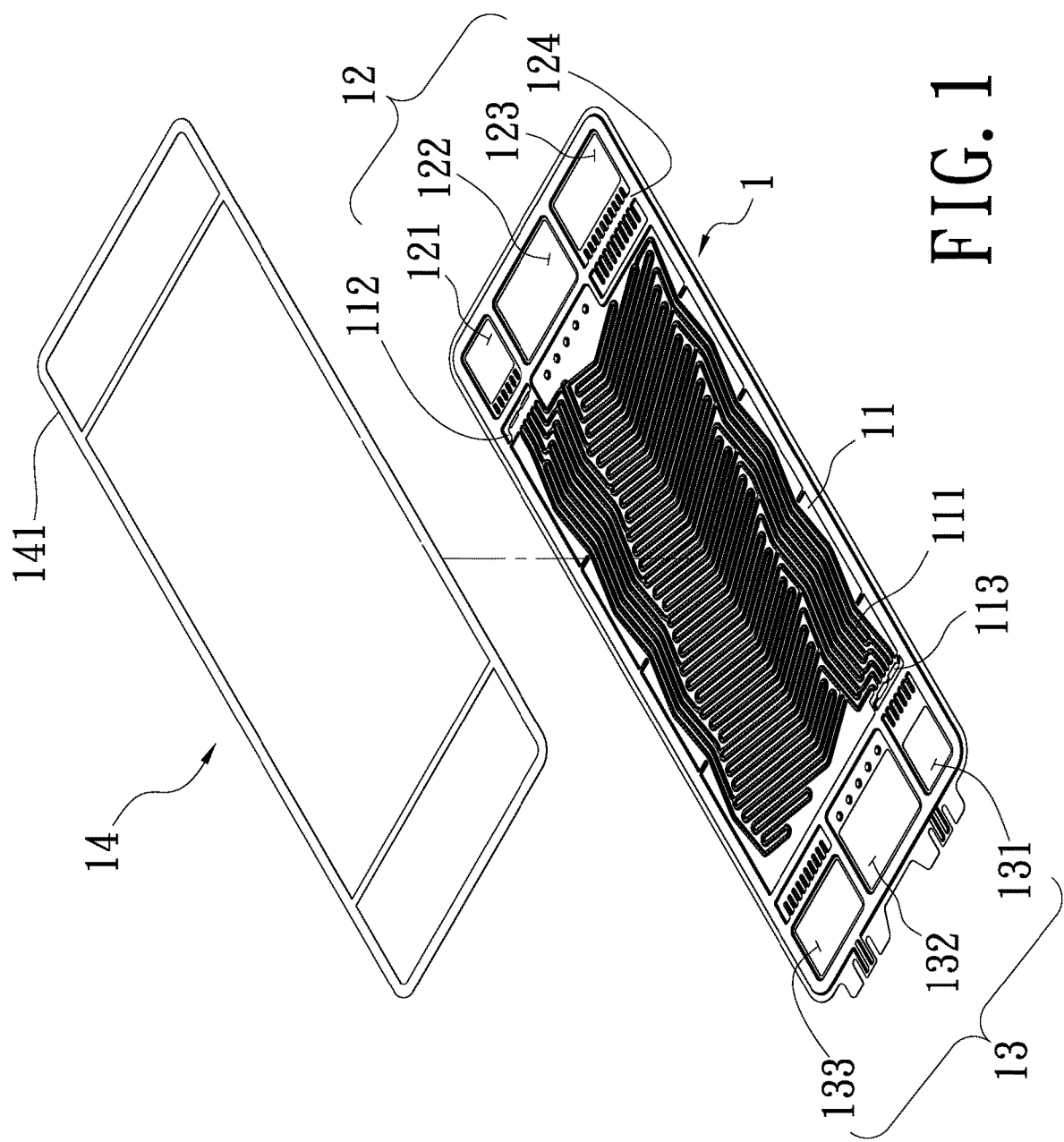
FIG. 1 is a top view showing an anode electrode plate of a bipolar plate intake structure of a fuel cell having drainage channels according to the present invention.
Figure 2:
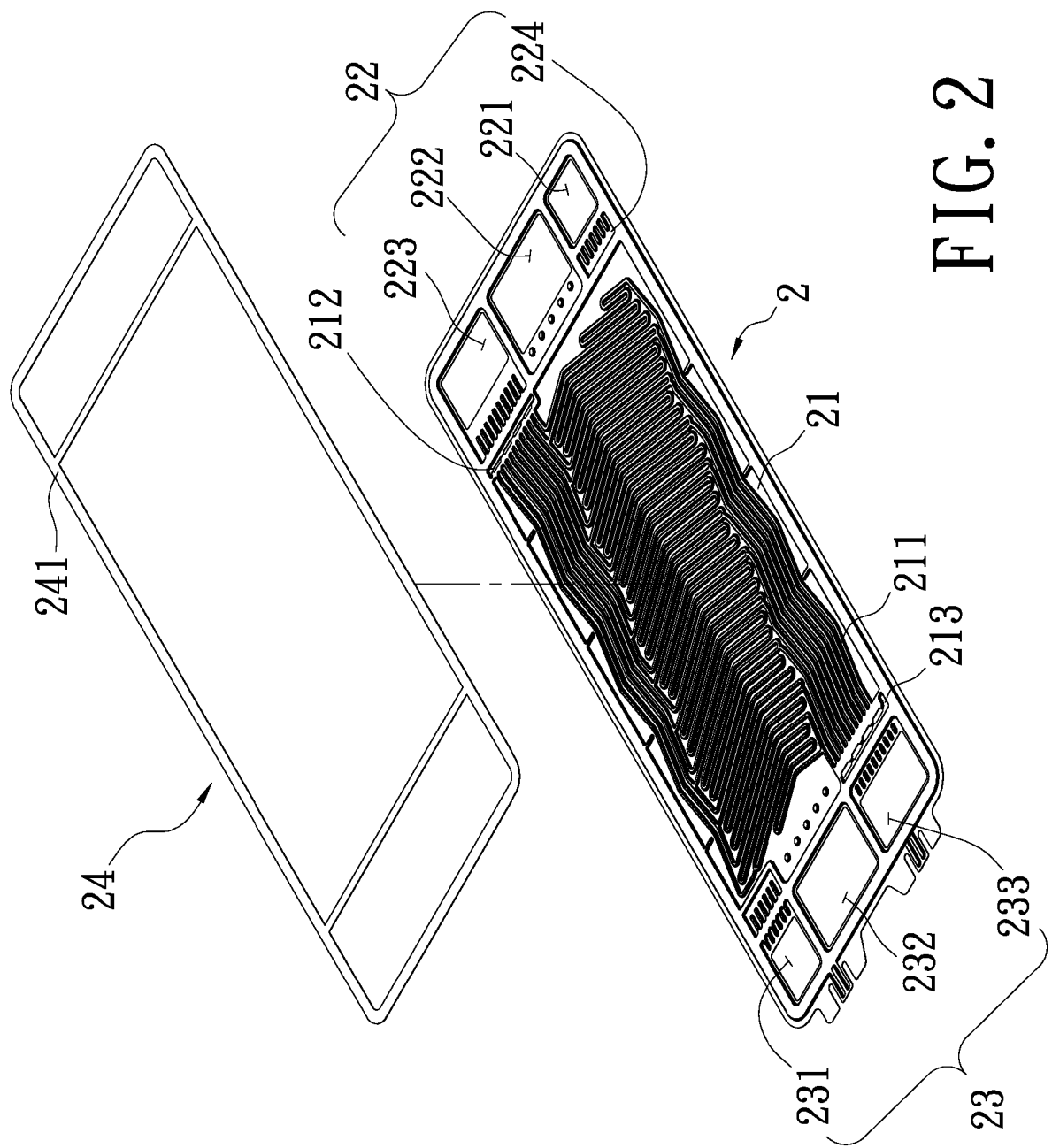
FIG. 2 is a top view showing a cathode electrode plate of a bipolar plate intake structure of a fuel cell having drainage channels according to the present invention.

As showed in FIGS. 1-2, a bipolar plate intake structure of a fuel cell having drainage channels comprises:

an anode electrode plate (1) having a gas flow path plane (11) shaped by stamping processing and having a plurality of flow ducts (111) for a flow of hydrogen, a first inlet portion (12) disposed on one side of the gas flow path plane (11), and a first outlet portion (13) disposed on the other side of the gas flow path plane (11) and being mirror symmetric and up-and-down symmetric to the first inlet portion (12), wherein the first inlet portion (12) has a hydrogen entry end (121), a coolant inflow hole (122), and an oxygen entry end (123), and wherein the first outlet portion (13) has a hydrogen outlet end (131), a coolant outflow hole (132), and an oxygen outlet end (133), the hydrogen flowing into the hydrogen entry end (121) of the first inlet portion (12), passing through a hydrogen inlet (112), the plurality of flow ducts (111) and a hydrogen outlet (113), and finally flowing out of the hydrogen outlet end (131) of the first outlet portion (13);

a cathode electrode plate (2) having a gas flow path plane (21) shaped by stamping processing and having a plurality of flow ducts (211) for a flow of oxygen, a second inlet portion (22) disposed on one side of the gas flow path plane (21), and a second outlet portion (23) disposed on the other side of the gas flow path plane (21) and being mirror symmetric and up-and-down symmetric to the second inlet portion (22), wherein the second inlet portion (22) has a hydrogen entry end (221), a coolant inflow hole (222), and an oxygen entry end (223), and wherein the second outlet portion (23) has a hydrogen outlet end (231), a coolant outflow hole (232), and an oxygen outlet end (233), the oxygen flowing into the oxygen entry end (223) of the second inlet portion (22), passing through an oxygen inlet (212), the plurality of flow ducts (211) and an oxygen outlet (213), and finally flowing out of the oxygen outlet end (233) of the second outlet portion (23);

a first sealing member (14) preferentially made of a Teflon® material or an injection molding resin material and having a first sealing structure (141) for correspondingly sealing the anode electrode plate (1), wherein the first sealing structure (141) has three compartments for isolating the gas flow path plane (11), the first inlet portion (12), and the first outlet portion (13) from each other, and wherein the first inlet portion (12) further has a first drainage channel (124) on a position of the first sealing structure (141) stacking thereon for guiding a flow of the hydrogen from an external; and a second sealing member (24) preferentially made of a Teflon® material or an injection molding resin material and having a second sealing structure (241) for correspondingly sealing the cathode electrode plate (2), wherein the second sealing structure (241) has three compartments for isolating the gas flow path plane (21), the second inlet portion (22), and the second outlet portion (23) from each other, and wherein the second inlet portion (22) further has a second drainage channel (224) on a position of the second sealing structure (241) stacking thereon for guiding a flow of the oxygen from an external.

In addition, the anode electrode plate (1) is preferentially made of a metal material, more preferentially a stainless steel plate having a thickness ranging from 0.1 mm to 0.2 mm, more preferentially 0.15 mm, and the anode electrode plate (1) has a total reaction area of 202.7 $cm^2$. The elongation, width and the total reaction area of the flow ducts (111) of the anode electrode plate (1) are 0.5 mm, 1 mm and 132 $cm^2$, respectively.

In addition, the cathode electrode plate (2) is preferentially made of a metal material, more preferentially a stainless steel plate having a thickness ranging from 0.1 mm to 0.2 mm, more preferentially 0.15 mm, and the cathode electrode plate (2) has a total reaction area of 202.7 $cm^2$. The elongation, width and the total reaction area of the flow ducts (211) of the cathode electrode plate (2) are 0.5 mm, 1 mm and 132 $cm^2$, respectively.

Preferentially, the first sealing member (14) has a thickness ranging from 0.4 mm to 0.8 mm. According to an embodiment of the present invention, the first sealing member (14) is made of an injection molding resin material for a subsequent mass production and has a thickness of 0.6 mm.

Preferentially, the second sealing member (24) is made of a Teflon® material or an injection molding resin material and has a thickness ranging from 0.4 mm to 0.8 mm. According to an embodiment of the present invention, the second sealing member (24) is made of an injection molding resin material for a subsequent mass production and has a thickness of 0.6 mm.

The anode electrode plate (1) and the cathode electrode plate (2), or a coolant liquid flow path are joined together by a welding process, preferentially a laser beam welding process, for sealing a flow field. An outer ring contact surface of the anode electrode plate (1) and the cathode electrode plate (2) is a welding portion. After the inlets and outlets of gas and an outer frame of the two metal bipolar plates are welded, the purpose of seal of the present invention can be achieved. In such a case, the present invention prevents leakages of coolant liquid and has efficacy of strengthening the overall structure of the fuel cell.

Figure 3:
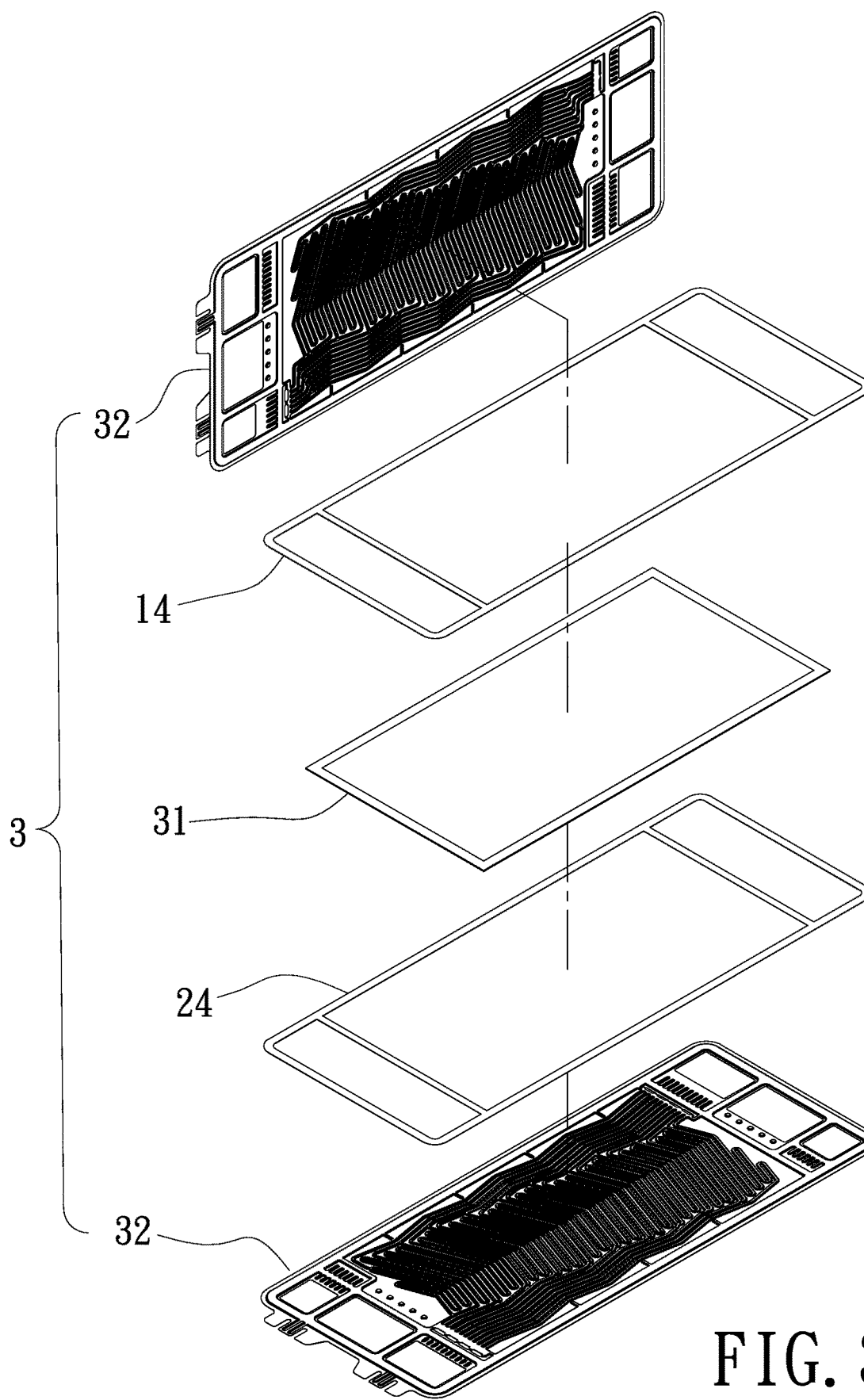
FIG. 3 is a schematic diagram showing a fuel cell unit in assembly of a bipolar plate intake structure of a fuel cell having drainage channels according to the present invention.

Referring to FIG. 3, a schematic diagram showing a fuel cell unit in assembly of a bipolar plate intake structure of a fuel cell having drainage channels according to the present invention is disclosed. The present invention also provides a fuel cell having a plurality of fuel cell units (3) connected in series, each of the plurality of fuel cell units (3) comprising a membrane electrode assembly (31) and two bipolar plate intake structures (32) which are reversely disposed on each other and have the anode electrode plate (1), the cathode electrode plate (2), the first sealing member (14) and the second sealing member (24) in each as described above, wherein the first sealing member (14), the membrane electrode assembly (31) and the second sealing member (24) are sequentially arranged between the two bipolar plate intake structures (32), and wherein the anode electrode plate (1) and the cathode electrode plate (2) of each of the two bipolar plate intake structures (32) is joined together by a welding process. In addition, the first sealing member (14) is disposed on one end of the anode electrode plate (1) of the bipolar plate intake structures (32), and the second sealing member (24) is disposed on one end of the cathode electrode plate (2) of the bipolar plate intake structures (32).

Figure 4:
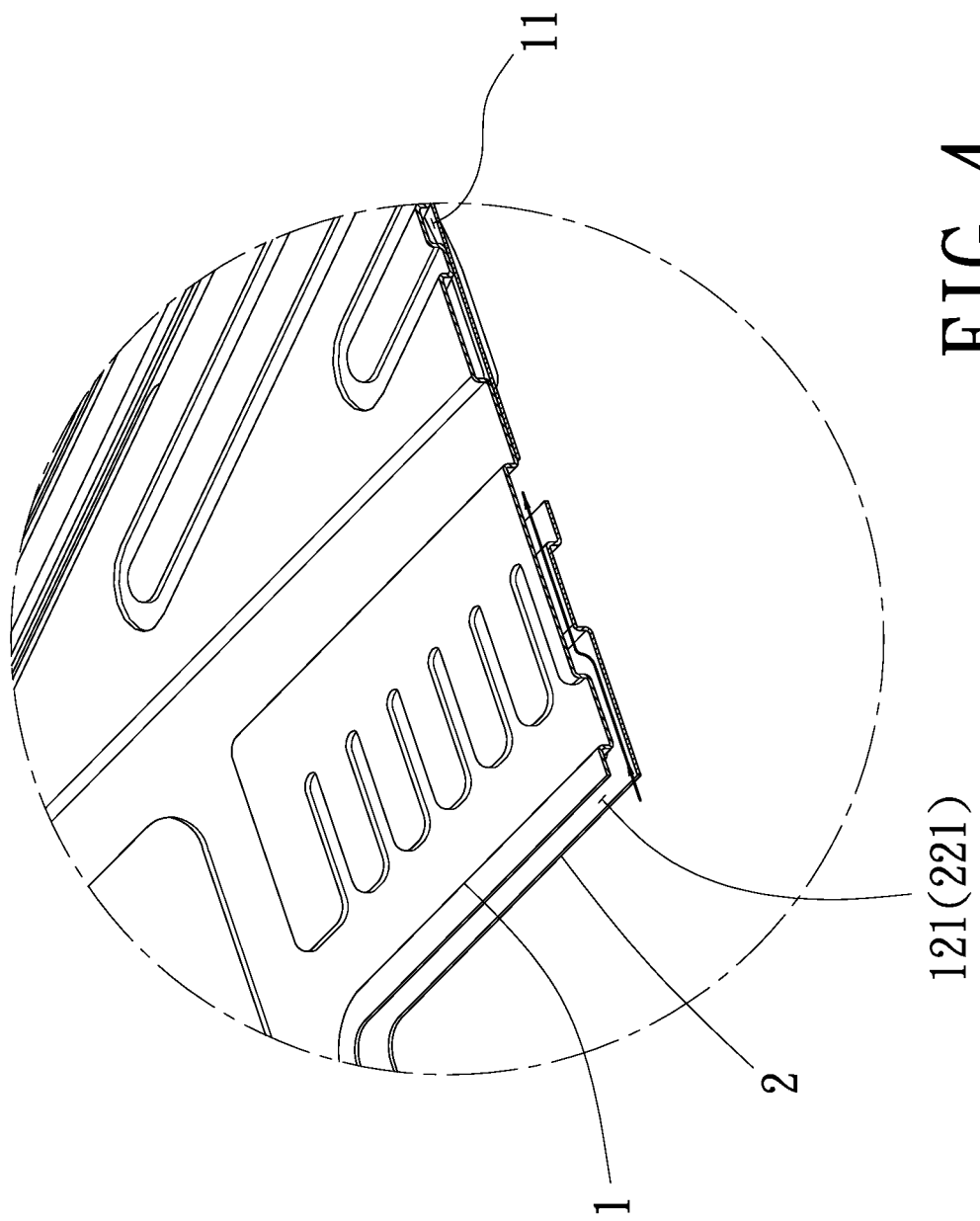
FIG. 4 is a sectional view showing a drainage channel of a bipolar plate intake structure of a fuel cell having drainage channels according to the present invention.

Referring to FIG. 4, a sectional view showing a drainage channel of a bipolar plate intake structure of a fuel cell having drainage channels according to the present invention is revealed. In an embodiment of an anode electrode plate (1) and a cathode electrode plate (2) reversely disposed on each other, the hydrogen of fuel gas flows into the hydrogen entry ends (121) (221), and then passes through the hydrogen inlet (112) and a gap between the hydrogen inlet (112) and the cathode electrode plate (2) for further flowing into the gas flow path plane (11) of the anode electrode plate (1). The arrow shown in FIG. 4 is the route of hydrogen.

Figure 5:
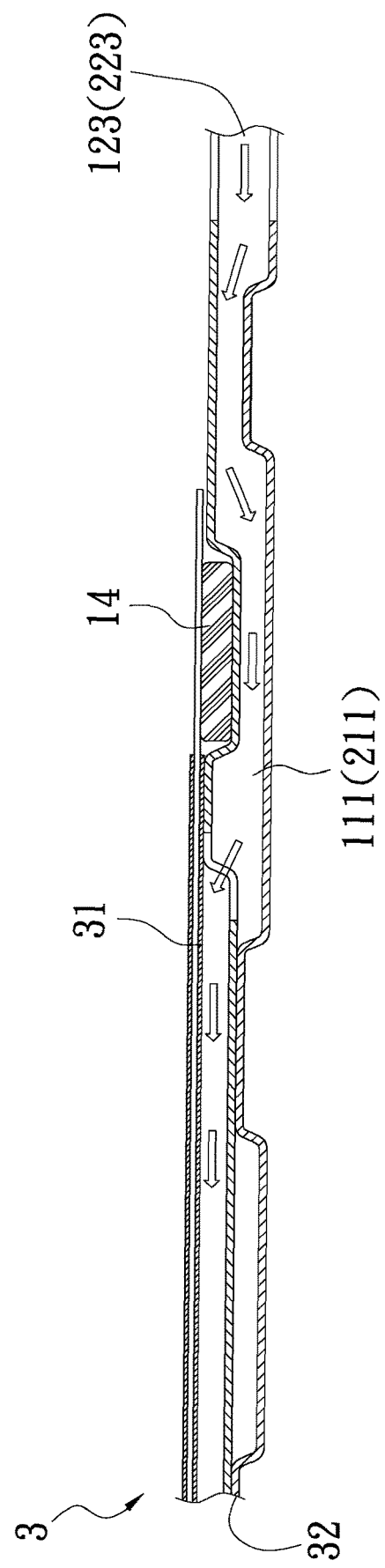
FIG. 5 is a sectional view showing a fuel cell unit of a bipolar plate intake structure of a fuel cell having drainage channels according to the present invention.

Referring to FIG. 5, a sectional view showing a fuel cell unit of a bipolar plate intake structure of a fuel cell having drainage channels according to the present invention is revealed. A bipolar plate intake structure (32) has an anode electrode plate (1) assembled to a cathode electrode plate (2). The oxygen of fuel gas flows into the oxygen entry ends (123) (223), and then passes through a plurality of flow ducts (111) (211). The arrow shown in FIG. 5 is the route of oxygen entered from the oxygen entry ends (123) (223). A first sealing member (14) and a second sealing member (24) are completely sealed to prevent gas leakages.

In an actual practice according to the above description, the anode electrode plate (1) and the cathode electrode plate (2) are made of metal materials, preferentially a stainless steel plate having a thickness ranging from 0.1 mm to 0.2 mm, more preferentially 0.15 mm and having a total reaction area of 202.7 $cm^2$. The elongation, width and the total reaction area of the flow ducts (111) (211) are 0.5 mm, 1 mm and 132 $cm^2$, respectively. The processing method of shaping the flow ducts (111) (211) is mainly by a stamping processing. The anode electrode plate (1) has a gas flow path plane (11) shaped by stamping processing and having a plurality of flow ducts (111) for a flow of hydrogen, a first inlet portion (12) disposed on one side of the gas flow plane (11), and a first outlet portion (13) disposed on the other side of the gas flow path plane (11) and being mirror symmetric and up-and-down symmetric to the first inlet portion (12). The hydrogen flows into the hydrogen entry end (121) of the first inlet portion (12), passing through the hydrogen inlet (112), the plurality of flow ducts (111) and the hydrogen outlet (113), and finally flows out of the hydrogen outlet end (131) of the first outlet portion (13). The first inlet portion (12) is also disposed with a coolant inflow hole (122) and an oxygen entry end (123). The first outlet portion (13) is also disposed with a coolant outflow hole (132) and an oxygen outlet end (133). Furthermore, the cathode electrode plate (2) has a gas flow path plane (21) shaped by stamping processing and having a plurality of flow ducts (211) for a flow of oxygen, a second inlet portion (22) disposed on one side of the gas flow path plane (21), and a second outlet portion (23) disposed on the other side of the gas flow path plane (21) and being mirror symmetric and up-and-down symmetric to the second inlet portion (22). The oxygen flows into the oxygen entry end (223) of the second inlet portion (22), passing through the oxygen inlet (212), the plurality of flow ducts (211) and the oxygen outlet (213), and finally flows out of the oxygen outlet end (233) of the second outlet portion (23). The second inlet portion (22) is also disposed with a coolant inflow hole (222) and a hydrogen entry end (221). The second outlet portion (23) is also disposed with a coolant outflow hole (232) and an oxygen outlet end (233).

In addition, the first sealing member (14) has a first sealing structure (141) for correspondingly sealing the anode electrode plate (1), and the first sealing structure (141) has three compartments for isolating the first inlet portion (12), the first outlet portion (13), and the gas flow path plane (11) from each other. The first inlet portion (12) is further formed with a first drainage channel (124) on a position of the first sealing structure (141) stacking thereon for guiding a flow of the hydrogen from an external. The first sealing member (14) is made of an injection molding resin material for a subsequent mass production of the required. The first sealing member (14) has a thickness of 0.6 mm.

The second sealing member (24) has a second sealing structure (241) for correspondingly sealing the cathode electrode plate (2). The second sealing structure (241) has three compartments for isolating the second inlet portion (22), the second outlet portion (23), and the gas flow path plane (21) from each other. The second inlet portion (22) is further formed with a second drainage channel (224) on a position of the second sealing structure (24) stacking thereon for guiding a flow of the oxygen from an external. The second sealing member (24) is made of an injection molding resin material for a subsequent mass production of the required. The second sealing member (24) has a thickness of 0.6 mm. The thickness of the first sealing member (14) and the second sealing member (24) stacking together must be slightly larger than the thickness of the membrane electrode assembly (MEA) to withstand deformation caused by the pressure in a packaging process and to effectively achieve a sealed state.

Finally, the fuel cell in a practical application is constituted by the plurality of fuel cell units (3) connected in series to obtain enough power generation efficiency. In a fuel cell unit (3), the anode electrode plate (1) and the cathode electrode plate (2) are welded to form a bipolar plate intake structure (32). The plurality of gas flow path planes (11) of the anode electrode plate (1) and the plurality of gas flow path planes (21) of the cathode electrode plate (2) disposed on each other are staggered to form a plurality of void spaces which are flow paths for a flow of the coolant. In other words, the back sides of the plurality of gas flow path planes (11) (21) of the anode electrode plate (1) and the cathode electrode plate (2) are also named the outer sides of the anode electrode plate (1) and the cathode electrode plate (2). When the outer side of the anode electrode plate (1) and the outer side of the cathode electrode plate (2) are stacked on each other, contacting portions of the anode electrode plate (1) and the cathode electrode plate (2) form an isolation whereas the non-contacting void spaces form the flow paths for the flow of the coolant liquid. The grid-like spaces formed by the anode electrode plate (1) stacking on the cathode electrode plate (2) can be used as a passage of a coolant circulation. The coolant flow field is as large as possible to maximize the cooling effects. Furthermore, the contacting portions must be sufficient to withstand the pressure of compression in assembling the fuel cell. Accordingly, the metal bipolar plate comprising the anode electrode plate (1) and the cathode electrode plate (2) has a flexible and delicate design to meet cooling requirements and to provide a higher power density related to weight.

Furthermore, in manufacturing the fuel cell unit (3), the two bipolar plate intake structures (32), the first sealing member (14), and the second sealing member (24) are adopted. Specifically, the two bipolar plate intake structures (32) are reversely disposed on each other. The first sealing member (14), the membrane electrode assembly (31) and the second sealing member (24) are sequentially arranged between the two bipolar plate intake structures (32). The first sealing member (14) is disposed on one end of the anode electrode plate (1) of the bipolar plate intake structures (32), and the second sealing member (24) is disposed on one end of the cathode electrode plate (2) of the bipolar plate intake structures (32). The plurality of fuel cell units (3) are further connected in series to form the fuel cell. According to the above description, the thickness of the first sealing member (14) and the second sealing member (24) stacking together must be slightly larger than the thickness of the membrane electrode assembly (MEA) to withstand deformation caused by the pressure in a packaging process and to effectively achieve a sealed state. Moreover, the first sealing member (14) and the second sealing member (24) must completely seal the gaps to prevent leakages of fuel gas and an oxidant of the fuel cell. In addition to enhancing the integrity of seal by the first sealing member (14) and the second sealing member (24), the first drainage channel (124) is further formed on the first inlet portion (12) relation to the first sealing structure (141) and the second drainage channel (224) is further formed on the second inlet portion (22) relation to the second sealing structure (241), so the gas from an external can be guided to the drainage channels for reaction.

Compared with the technique available now, the present invention has the following advantages:

1. The first sealing member and the second sealing member made of a Teflon® material or an injection molding resin material can fill the gaps among the membrane electrode assembly, the anode electrode plate and the cathode electrode plate to avoid leakages of fuel gas and an oxidant and to ensure that the location of the membrane electrode assembly is stable. Compared with the conventional technique having a complicated assembly process that an entry end and an outlet end must be further affixed with a metal sheet as a reinforcement to withstand the pressure force in assembling to seal members and having an increased probability of leakages due to a poor assembly, the present invention simplifies the assembly process, enhances the integrity of seal, and has efficacy of strengthening the overall structure of the fuel cell.

2. The first sealing member and the second sealing member of the present invention seal the bipolar plates to form drainage channels on the first inlet portion and the second inlet portion for a flow of gas, which prevents gas leakages of the conventional structure having a gas flow path directly communicated with a gas entry and a gas outlet.

3. The coolant liquid flow path of the bipolar plate intake structure of the present invention is directly welded by a laser beam welding for sealing a flow field. An outer ring contact surface of the anode metal bipolar plate and the cathode metal bipolar plate is a welding portion. After the inlets and outlets of gas and an outer frame of the two metal bipolar plates are welded, the purpose of a sealed state can be achieved, so the present invention prevents leakages of coolant liquid and has efficacy of strengthening the overall structure of the fuel cell.

What is claimed is:

1. A bipolar plate intake structure of a fuel cell having drainage channels, comprises:

an anode plate having a perimeter portion defining a first plane, and a first gas flow path shaped to undulate out of opposing sides of the first plane and extend in both a longitudinal direction and a transverse direction, the anode plate further having a first plurality of flow ducts through which hydrogen flows, a first inlet portion disposed on one side of the first gas flow path on the first plane, and a first outlet portion disposed on an opposing side of the first gas flow path on the first plane and being mirror symmetric and up-and-down symmetric to the first inlet portion, wherein the first inlet portion has a hydrogen entry end, a coolant inflow hole, an oxygen entry end and a first drainage channel, and wherein the first outlet portion has a hydrogen outlet end, a coolant outflow hole, and an oxygen outlet end, the hydrogen flowing into the hydrogen entry end of the first inlet portion, passing through a hydrogen inlet, the first plurality of flow ducts and a hydrogen outlet, and finally flowing out of the hydrogen outlet end of the first outlet portion;

a cathode plate having a perimeter portion defining a second plane, and a second gas flow path shaped to undulate out of opposing sides of the second plane and extend in both a longitudinal direction and a transverse direction, the undulations of the second gas flow path being in a direction to mirror the undulations of the first gas flow path, the cathode plate further having a second plurality of flow ducts through which oxygen flows, a second inlet portion disposed on one side of the second gas flow path on the second plane, and a second outlet portion disposed on an opposing side of the second gas flow path on the second plane and being mirror symmetric and up-and-down symmetric to the second inlet portion, wherein the second inlet portion has a hydrogen entry end, a coolant inflow hole, an oxygen entry end and a second drainage channel, and wherein the second outlet portion has a hydrogen outlet end, a coolant outflow hole, and an oxygen outlet end, the oxygen flowing into the oxygen entry end of the second inlet portion, passing through an oxygen inlet, the second plurality of flow ducts and an oxygen outlet, and finally flowing out of the oxygen outlet end of the second outlet portion;

a first sealing member having a first sealing structure for sealing the anode plate, wherein the first sealing structure has three compartments for isolating the first gas flow path, the first inlet portion, and the first outlet portion from each other, and a portion of the first sealing member being disposed in overlaying relationship with the first drainage channel, the portion of the first sealing member and the first drainage channel together defining a hydrogen flow path; and a second sealing member having a second sealing structure for sealing the cathode plate, wherein the second sealing structure has three compartments for isolating the second gas flow path, the second inlet portion, and the second outlet portion from each other, and a portion of the second sealing member being disposed in overlaying relationship with the second drainage channel, the portion of the second sealing member and the second drainage channel together defining an oxygen flow path.

2. The bipolar plate intake structure of a fuel cell having drainage channels as claimed in claim 1, wherein the first sealing member is made of one of a Teflon® material or an injection molding resin material.

3. The bipolar plate intake structure of a fuel cell having drainage channels as claimed in claim 2, wherein the first sealing member has a thickness ranging from 0.4 mm to 0.8 mm.

4. The bipolar plate intake structure of a fuel cell having drainage channels as claimed in claim 1, wherein the second sealing member is made of one of a Teflon® material or an injection molding resin material.

5. The bipolar plate intake structure of a fuel cell having drainage channels claimed in claim 4, wherein the second sealing member has a thickness ranging from 0.4 mm to 0.8 mm.

6. The bipolar plate intake structure of a fuel cell having drainage channels as claimed in claim 1, wherein the anode plate is joined to the cathode plate by a welding process for sealing a flow field.

7. The bipolar plate intake structure of a fuel cell having drainage channels as claimed in claim 6, wherein the welding process is a laser beam welding.

8. A fuel cell having a plurality of fuel cell units connected in series, each of the plurality of fuel cell units comprises a membrane electrode assembly and two bipolar plate intake structures as claimed in claim 1 and reversely disposed on each other, wherein the first sealing member, the membrane electrode assembly and the second sealing member are sequentially arranged between the two bipolar plate intake structures, and wherein each of the two bipolar plate intake structures has the anode plate joined to the cathode plate by a welding process.

9. The fuel cell having a plurality of fuel cell units connected in series as claimed in claim 8, wherein the first sealing member is disposed on the anode plate and wherein the second sealing member is disposed on the cathode plate.

* * * * *